United States Patent [19]

Repplinger

[11] 4,403,764

[45] Sep. 13, 1983

[54] METHOD AND APPARATUS FOR CONTROLLING FLOW OF WORK MATERIALS

[75] Inventor: Thomas J. Repplinger, Cary, Ill.

[73] Assignee: Otto Engineering, Inc., Carpentersville, Ill.

[21] Appl. No.: 309,711

[22] Filed: Oct. 8, 1981

[51] Int. Cl.³ .............................................. F16L 55/14
[52] U.S. Cl. .......................................... 251/5; 251/6; 222/571
[58] Field of Search ....................... 251/5, 6; 417/476; 222/571, 209

[56] References Cited

U.S. PATENT DOCUMENTS

| 518,927 | 4/1894 | Rothchild | 251/58 |
| 3,511,468 | 5/1970 | Young | 222/571 |
| 3,709,461 | 1/1973 | Johnson | 251/58 |
| 4,228,930 | 10/1980 | Hogan | 222/212 |

Primary Examiner—Alan Cohan
Assistant Examiner—Sheri M. Novack

[57] ABSTRACT

An improved method for precision control of a wide variety of work material liquids and an improved pinch valve incorporating that method is disclosed. The method involves constricting a discrete site on a resilient tube having liquids flowing therethrough to pinch off flow, then moving the constriction upstream to maintain flow stoppage and create a partial vacuum to cause positive suck back, the distance the constriction is moved being selectively determinable to selectively adjust suck back. An apparatus for practicing the method comprises an external roller shutoff member which is movable in a direction to intersect with and then move counter to work material flow within a resilient tube to compress the tube against a ramp and gives positive repeatable shutoff of the flow. The further upstream movement of the roller shutoff member after reaching the shutoff position allows the natural resilience of the tube to return from its compressed to its natural uncompressed position and thereby create a partial internal vacuum which in turn creates a positive suck back of work material at the outlet to provide dripless precise shutoff. The flow through the tube is unobstructed when the valve is in open position. The valve is biased closed and is selectively actuable against the bias to open position. The amount of travel of the roller shutoff member after shutoff is adjustable to adjust suck back for different conditions and different work materials. The movement of the shutoff member is uncomplicatingly linear for easy selective actuation. The rolling cooperative action of parts during shutoff and suck back permits control of flow of work liquids with particulates therewithin without destruction of the parts from the particulates to provide long life with repeated cycling.

5 Claims, 23 Drawing Figures

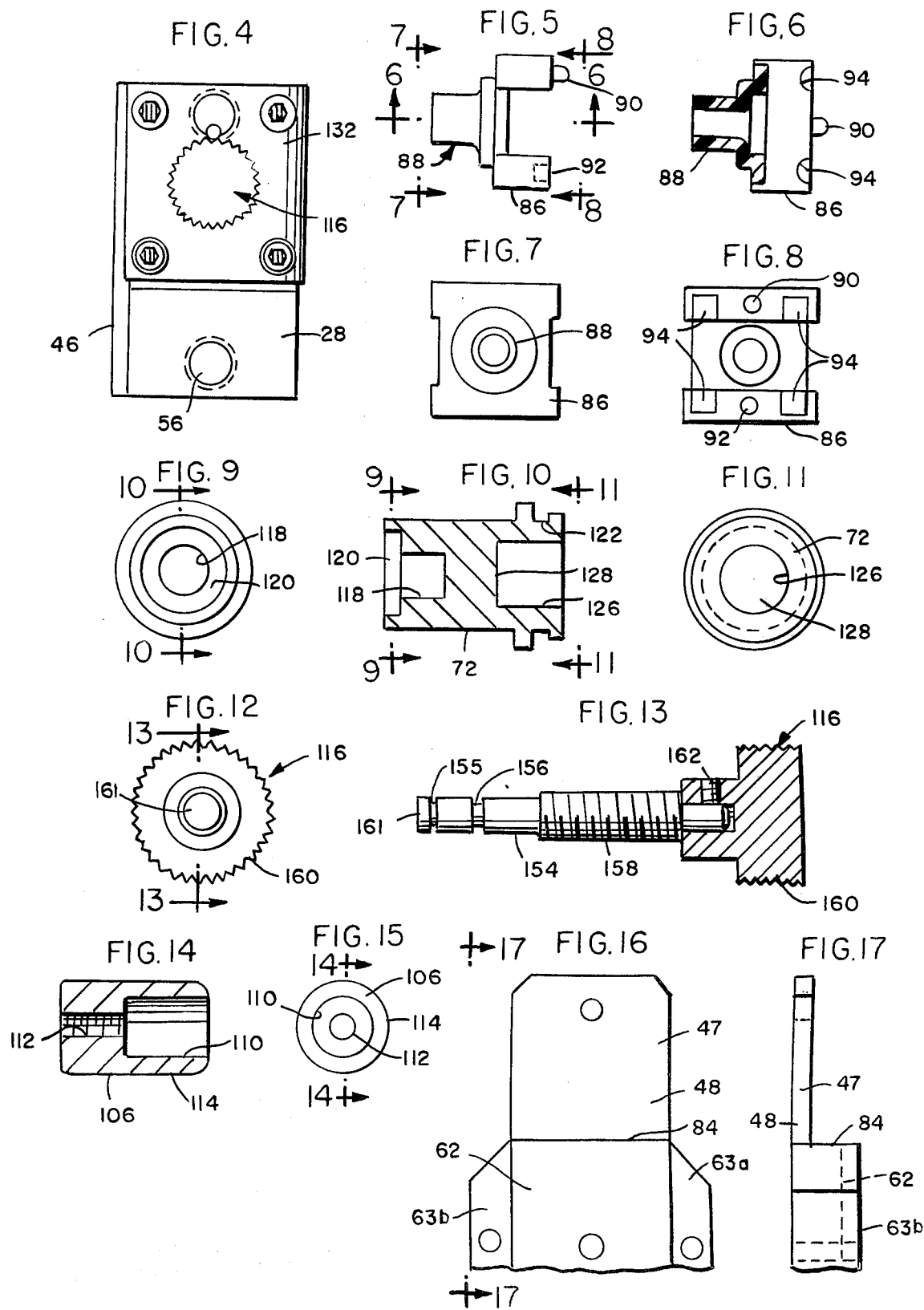

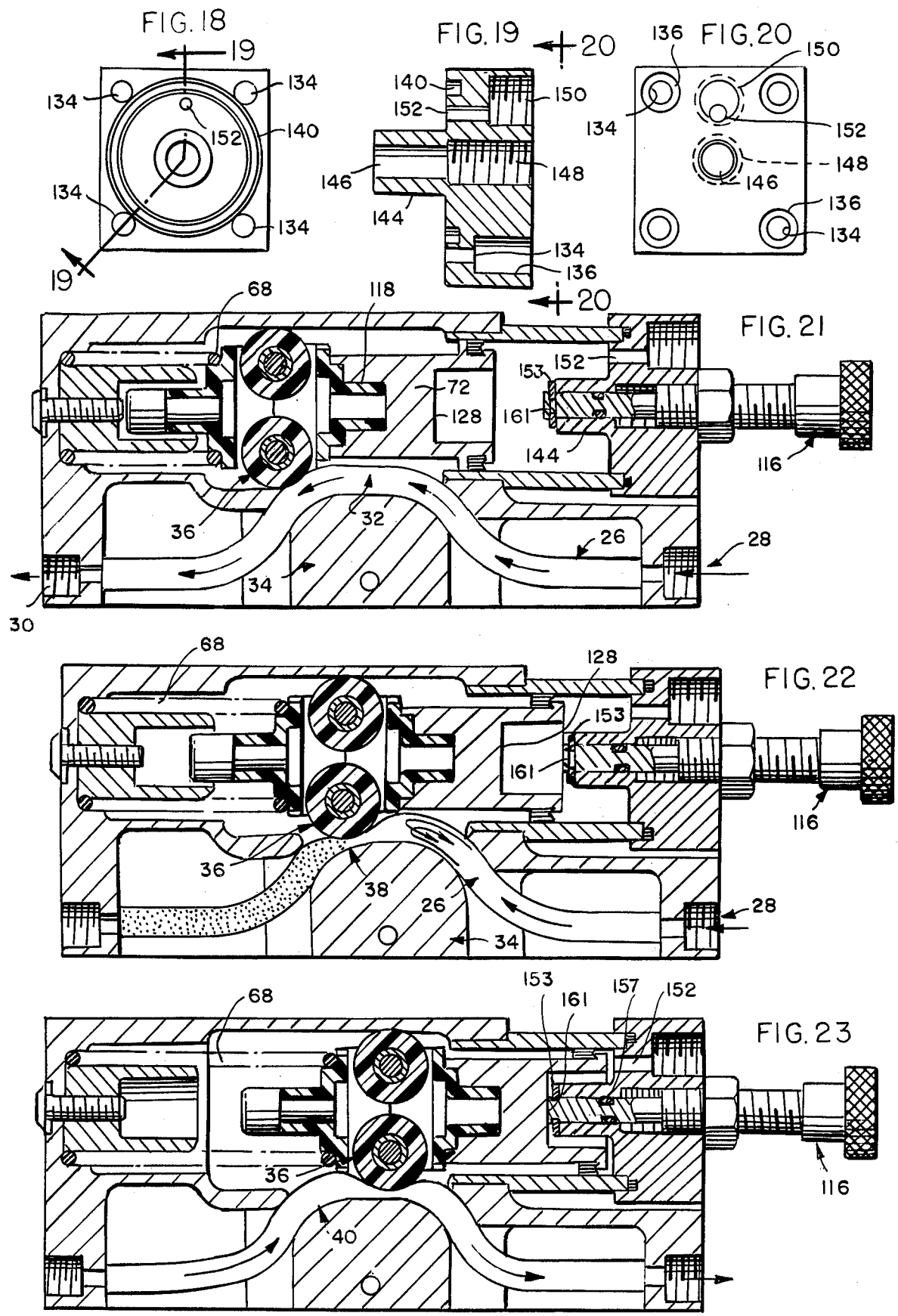

METHOD AND APPARATUS FOR CONTROLLING FLOW OF WORK MATERIALS

BACKGROUND AND SUMMARY

This invention relates to methods of precisely controlling stoppage and suck back of work liquids and to an improved pinch valve apparatus for practice of such method with both the method and apparatus being particularly useful for controlling a wide variety of work liquids including those with particulates therewithin. The method and apparatus features adjustable precision suck back on shutoff of flow.

Controlling the flow of liquids by pinching a resilient tube shut is well known. In its simplest form, the homeowner who bends the water hose pinches off the flow therein. Also, pinching off the flow by moving the resilient walls of a tube toward each other by application of a force at essentially right angle (transverse) to the tube is well developed practice. It is also well known that either one or more portions of the tube walls may be moved inwardly in the pinching operation, and various fixed ramps may be employed of both internal and external kinds to receive the movable tube wall to pinch off flow. In controlling flow of work liquids with particulates therewithin, such as liquid solder materials, epoxy resin components and the like, the repeated pinching (for example in excess of 100,000 cycles) at a single site has a tendency to abrade the resilient tube thereat, may cause cold flow or other distortions in the resilient tube at that site, and the pinching action under some circumstances may cause a partial separation of components in the work liquid being controlled. Also single site constriction of a resilient tube does not prevent drip of work liquid on shutoff at a downstream outlet with the resultant mess which is particularly undesirable in precision dispensing of work liquids used in assembly operations of various kinds. By creation of a partial vacuum intermediate the outlet and the shutoff site, a suck back of work liquid at the outlet and retention thereof in the system may be provided so as to eliminate drip on shutoff.

A partial vacuum may be created by simultaneously constricting 2 sites on a resilient tube and then removing the constricting force from the downstream site while maintaining the constriction of the upstream site. However this method does not overcome the aforenoted wear, cold flow and separation problems. Also, it does not afford easy adjustability of suck back for a variety of conditions and work liquid materials.

The improved method disclosed herein is elegantly simple, is easy to practice with a variety of pinching mechanisms, and overcomes the aforementioned prior art problems. The method comprises the steps of introducing the compression constriction force to a resilient tube to start constriction, moving the constricting force in an upstream direction while increasing the constriction force until shutoff is obtained and thereafter, while the shutoff is maintained, further moving the constriction force along the tube in an upstream direction to cause the tube at the original shutoff site (and each site along the travel path up to final stop position) to return toward its uncompressed state thereby creating a partial vacuum for suck back. The amount of travel from the original shutoff site to final stop directly affects the amount of partial vacuum created in the system, and by adjusting the amount of travel after initial shutoff to final stop, the amount of suck back can be easily adjusted for a variety of conditions and work liquid materials. It is preferred that the compression restriction creating force be applied with a rolling action and in a semi-resilient manner along the tube which reduces wear on the tube and better accomodates to particulates in the work liquid.

Various types of mechanical approaches to practicing prior art methods have been devised which are commonly known as pinch valves of two major types, the internal and external. The internal types of pinch valve necessarily restrict flow per unit size of diameter flexible tube and are not well adapted for controlling some work materials such as those that contain particulates since the supporting internal surfaces may cause undesired eddy currents in the flow, be subject to wear or separation of or collection of particulates. Also complete disassembly to adjust the cooperating parts is required. Some examples are shown in U.S. Pat. Nos. 3,840,207 and 3,830,462.

External pinch valves generally compress a resilient tube by transverse to the flow of work material movement of a one or a pair of movable members against a ramp or against each other at a single location. These pinch valves create no internal vacuum adjacent the shutoff site with consequent drip of work material from an outlet as discussed. Examples of this type of pinch valve are shown in U.S. Pat. Nos. 2,842,331; 3,759,483; 3,932,065 and 4,099,700. Because of the geometry, these prior art devices provide apparatus where the flexible tube at the shutoff site(s) is subject to wear due to repetitive concentration of and maintenance of all pinch force thereat. Also for applications requiring a cycling capability in excess of 250 M, this transverse movement of the shutoff pinching member or members is not suitable over time in that it can produce cold flow or other anomalies in the resilient member.

The novel pinch valve for practicing the method disclosed herein is extremely useful for applications for automatically actuated precision dispensing of hard to dispense liquid work materials such as epoxy resins, liquid solder pastes and the like in assembly operations where repeatable dependable startup and shutoff is required and adjustability to meet variability in work or work materials is necessary. It has been found dependable in operation in excess of 500 M cycles in the dispensing of the liquid resin components of epoxy resin systems. In assembly operations where parts are moved to a station adjacent an outlet from a liquid dispenser, it is particularly important that the outlet not drip liquid work material after shutoff and while a new work piece is being moved to position adjacent the outlet or during other shutoff times.

The apparatus features of movable car assembly having a roller movable into engagement with and gradually compressing a resilient tube against a ramp, the parts being arranged so as to cause the tube to be fully compressed at a site upstream from initial engagement. The roller is preferably semi-resilient. The car and the ramp surfaces are aligned in a manner to permit travel of the roller in an upstream direction after complete pinchoff of the flow to a final stop so that as the roller moves, the tube will return toward its normal uncompressed state creating a partial vacuum. The final stop position of the car is adjustable so as to adjust the amount of travel and hence the amount of suck back. The downstream side of the ramp is curved away from the straight path of the car roller so that easy to accomplish straight line movement of the car will still provide a gradual compression of the ramp overlaying tube along the length thereof. The car may be biased toward final stop position and actuated by a pneumatic or other actuator to its spaced from the tube position to provide a biased "closed" actuated "open" pinch valve. The exact initial position of the car is also adjustable. The valve also features easy access to replace the resilient tube after several hundred thousand cycles and an open bottom for quick drainage of the work liquid from the moving parts in the event of unexpected bursting of the tube.

The valve is well adapted for mass manufacturing techniques and is easily serviced by relatively unskilled personnel when in use in the field. The semi-resilient roller and trapped resilient tube being compressed on a fixed ramp accomodate well to hard to dispense liquids with particulates therein without the degree of wear of prior art devices. The valve is compact, easy to ship, versatile in its applications, may be easily assembled by others as a component to a larger system, can be made in a wide range of sizes, has few critical tolerances, all while providing dependable repeatable extremely long lived precision shutoff of flow with suck back.

BRIEF DESCRIPTION OF THE DRAWINGS

FIG. 4 is an end view along lines 4—4 of FIG. 1;

FIG. 5 is an isolated top view of one half of the car which is shown in section in FIG. 2;

FIG. 6 is a sectional view of the one half of the car along lines 6—6 of FIG. 5;

FIG. 7 is an end view of the one half of the car along the lines of 7—7 of FIG. 5;

FIG. 8 is an end view along lines 8—8 of FIG. 5;

FIG. 9 is an isolated end view of the pneumatic piston used in the actuator and taken along lines 9—9 of FIG. 10;

FIG. 10 is a sectional view along lines 10—10 of FIG. 9;

FIG. 11 is a right hand end view taken along lines 11—11 of FIG. 10;

FIG. 12 is an isolated end view of the adjustment screw member;

FIG. 13 is a sectional view along lines 13—13 of FIG. 12;

FIG. 14 is a sectional view along lines 14—14 of FIG. 15 of the spring retainer and plug member in isolation;

FIG. 15 is an end view of the spring plug shown in section in FIG. 14;

FIG. 16 is a front view of the spacer plate shown in isolation from the assembly;

FIG. 17 is an end view of the spacer plate shown in FIG. 16 along lines 17—17 thereof;

FIG. 18 is an end view of the end cap for the apparatus shown in isolation;

FIG. 19 is a sectional view along lines 19—19 of FIG. 18;

FIG. 20 is a right hand end view of the end cap along lines 20—20 of FIG. 19;

FIG. 21 is a sectional view similar to FIG. 2 illustrating the relative position of the parts in the apparatus practicing the improved method of controlling flow, a portion being diagrammatic, and where the roller member has just reached engagement with the resilient tube;

FIG. 22 is a view similar to FIG. 21, showing the relative position of the parts when the flow of materials within the tube has reached initial pinch off of flow; and FIG. 23 is a view similar to FIGS. 21 and 22 showing the change in relative position of the parts to cause suck back movement of work liquids from the outlet toward the inlet.

DETAILED DESCRIPTION OF THE INVENTION

Figure 1:
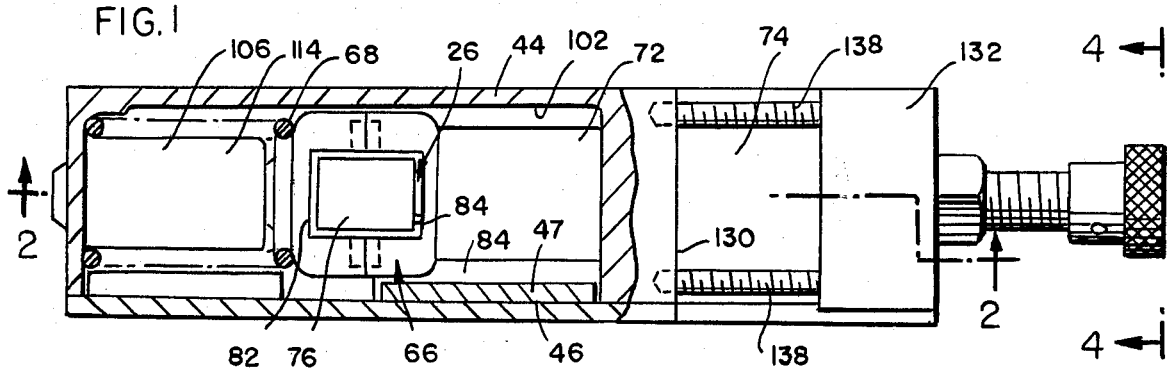
FIG. 1 is a top view, partially in section, of an improved pinch valve incorporating a method of constricting a discrete site of a resilient tube having liquids flowing therethrough to pinch off flow and moving the constriction upstream to maintain flow stoppage and create a partial vacuum to cause positive suck back.

The improved method for precision control of work materials is elegantly simple and is perhaps best perceived by a viewing of an improved apparatus utilizing the method as shown by the sequential movement of parts in FIGS. 21 to 23. As shown therein, a liquid tight conduit means 26 has an inlet means 28, an outlet means 30, and a resilient intermediate portion means 32 overlaying a fixed ramp means 34. Work material from a suitable pressurized source (not shown) may be attached to the inlet for passage through the conduit means 26 to the outlet means 30 as shown diagrammatically.

A roller means 36 is movable from a downstream position to the flow of work material, in an upstream direction in such a manner to compress the resilient intermediate portion 32 until it is totally constricted at an initial site 38 against the ramp means 34. Flow of work material is thus stopped between inlet means 28 and outlet means 30. Further movement of the roller means 36 from site 38 and parallel to the ramp means 34 top surface (to be later discussed in detail) causes the restriction to travel upstream maintaining the stoppage of flow of work material and allows the resilient intermediate portion 32 immediately downstream of the roller in the area 40 to commence return toward its uncompressed state. This creates an internal partial vacuum causing suckback of work material at the outlet means 30. It will be appreciated that any dispensing head downstream from the outlet (not shown) and attached in a fluid tight manner to said outlet means 30 will have the work material sucked back in turn.

By varying the amount of upstream travel of both the initial total constriction site 38 and the movement of the area 40 a relaxation of the pinching pressure on the downstream side of the roller means 36, the amount of partial vacuum and hence suck back may be varied to suit various conditions and work materials. More details about the improved method will become apparent through the more detailed explanation of the apparatus and further discussion. While a single roller engaging a resilient tube trapped between the roller and the ramp has been discussed, it is apparent that two or more opposed rollers could trappingly squeeze a tube shut and move in an upstream direction after initial total constriction to provide substantially equivalent functional results in practicing the disclosed method. However, the apparatus shown in the drawings is particularly well adapted to practice the improved method and shall now be discussed in detail.

Figure 3:
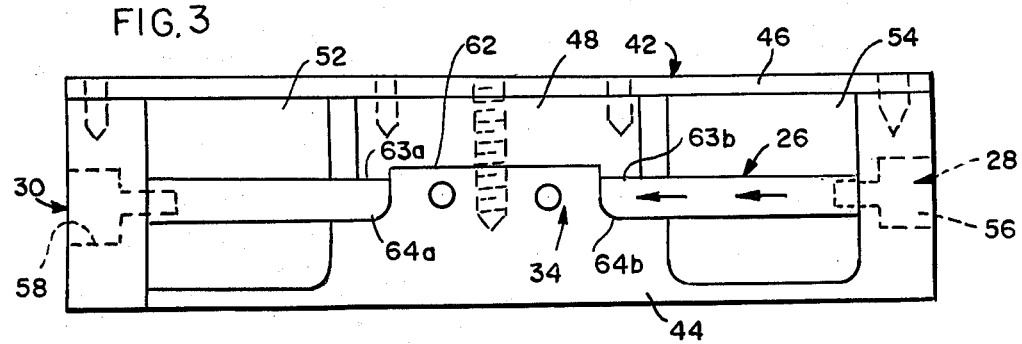
FIG. 3 is a bottom view of the apparatus shown in FIGS. 1 and 2.

More particularly, a valve body means 42 may be formed of three components, a body 44 per se, a cover plate 46, and a spacer member 48 attached intermediate the cover and body by suitable fasteners as shown in FIG. 3. The spacer member 48 is also shown in isolation in FIGS. 16 and 17. Each of the components of the valve body means 42 may be made of suitable metal such as aluminum or brass or the like or may be molded of a stable thermosetting plastic material. If molded, the spacer member 48 could be conveniently made integral with the cover plate 46.

Figure 2:
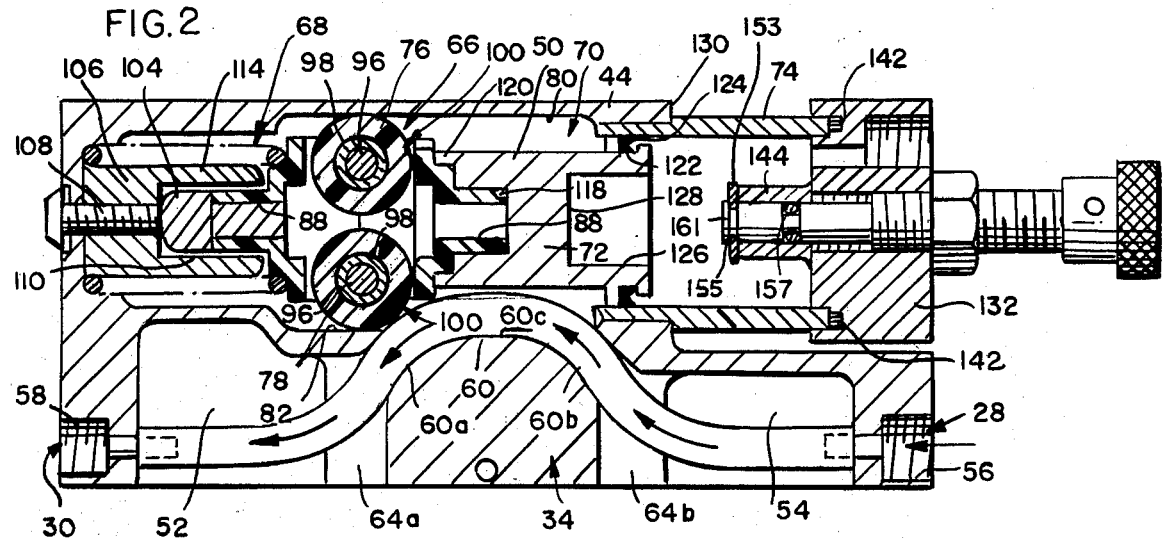
FIG. 2 is a sectional view along lines 2—2 of FIG. 1.

As may be perceived in FIG. 2, the valve body means 42 may be formed with an upper chamber 50, a first lower chamber 52 and a second lower chamber 54. The first and second lower chambers 52 and 54 are separated by the ramp means 34 and are each open at the bottom of the valve body. The valve body lower walls are aperatured at the lower central edges at 56 and 58 to respectively provide receipt of suitable inlet and outlet fittings which may extend therethrough for attachment of a resilient conduit means 26. Chambers 50, 52 and 54 communicate with each other adjacent ramp means 34. The resilient conduit means 26 extends from the inlet 56, into chamber 54, extends upwardly into chamber 50 and overlays a top surface 60 of the ramp means 34, then extends back downwardly into chamber 52 for connection with the outlet 58.

The spacer member 48 has a central relief surface 62 which is fastened to the valve body immediately below the ramp surface 60, the two non-relieved sections 63a and 63b providing one confining wall for the conduit means 26 as best shown in FIG. 3. The valve body 44 is relieved at 64a and 64b to confine a second confining wall for the other side of the conduit means 26 as it both exits the ramp surface area 60 and as it enters the ramp area as shown in FIGS. 2 and 3. As shown in FIG. 2, the top surface 60 of ramp means 34 is rounded at 60a and at 60b with a flat planar area 60c therebetween. It will be noted that if the resilient tube or conduit means 26 ruptures, the open lower end of the chambers 52 and 54 of the valve body permits the work liquid to easily drain and permits easy field replacement of the conduit means 26.

The upper valve body chamber 50 contains the spring-loaded car means 66 which is biased to the right as viewed in FIG. 2 by a suitable biasing means 68 here shown as a coil spring. Actuation means 70 comprising a pneumatic piston actuator 72 is attached to the car means 66 at one end and at the other coacts with a cooperative cylinder 74 to move the car means against the bias of spring 68.

The car means 66 mounts an upper roller 76 and a lower roller 78 which are configured and arranged to extend above and below the car means for rolling reciprocating movement engagement with the valve body and spacer in a straight line path along a horizontal line as viewed in FIG. 2. As seen in FIG. 1, the rollers 76 and 78 are larger than conduit 26. Upper roller 76 travels along and is guided and confined by relieved upper chamber 50 travel surface 80 (see FIG. 2). Lower roller 78 travels along and is confined and guided by the upper chamber 50 lower travel surface 82 and surface 84 of the spacer member 48, surfaces 82 and 84 being coplanar when the device is assembled.

The car means 66 may be conveniently made by assembly of two identical halves 86 together, the car half 86 being shown in isolation in FIGS. 5 through 8 and in assembled relationship in FIGS. 1 and 2. The car halves 86 are here shown as being of molded plastic, one such being found suitable being sold under the trademark Nylatron. The car halves 86 are essentially rectilinear in end view as shown in FIGS. 7 and 8 with an integral tubular extension 88 as shown in FIGS. 5 and 6. A molded pin 90 fits into the complimentary hole 92 when the two identical halves are assembled. Each car half 86 is formed with four parallel semicircular cut outs to receive roller axles 96 which are fixedly trapped therewithin when the cars are assembled. A suitable bronze or other bushing 98 is fixed to the respective upper and lower rollers 76 and 78 to run on the axles 96 as will be well understood. The resilient outer layer of the rollers 100 is preferably made of rubber or similar material with small cold flow characteristics. One such material found suitable is a polyurethane material presently used as elastomer springs sold by the Vlier Co. This has little heat build up under the amount of deflection encountered in operation of the device. In tests it has stood up well in over one million cycles showing very little wear either where it engages the conduit 26 or the surfaces 80, 82 and 84 aforedescribed. While the upper roller could be made of metal, it is preferable that both rollers' outer layers 100 be of the resilient kind as described, thereby increasing tolerance limits for accomodation to minute variations in the wall thickness of the resilient conduit, the variations in work liquid and requiring less severe tolerances of machined dimensional metal parts and molded parts of the rest of the assembly.

The car means 66 is prevented from cocking or walking on the reciprocating movement thereof by upper chamber 50 internal wall 102 and extension 47 of the spacer member shown in section in FIG. 1 and by the rollers 76 and 78 engaging surfaces 80, 82 and 84. It will be appreciated that ramp surface 60c is located slightly below surfaces 82 and 84 as viewed in FIG. 2, the dimension therebetween being slightly less than the combined dimension of the thickness of the resilient conduit 26 in its flattened state where it stops all flow.

A headed bumper pin 104 may have the shank portion snuggly fitted into tubular extension 88 of the car half 86 on the left side as viewed in FIG. 2. The enlarged head of pin 104 fits within and is guided by bore 110 of spring and bumper guide plug 106 which is fastened to the end wall of the upper chamber 50 by a fastener 108. The fastener 108 in threaded bore 112 of plug 106 may be adjustable to extend inwardly into bore 110 where adjustment of the full "open" position of the car 66 is desired. Alternatively the plug member 106 may be fastened to the valve body by other means (not shown) and threaded member 108 can be used only for adjustment, however most application will not need adjustment of the full "open" position. The outer surface 114 of plug 106 centers and retains the spring 68 in upper chamber 50. It will be noted that pin 104 and extension 88 of car half 86 move within bore 110 of plug 106 from the position shown in FIG. 2 to the outmost position defined by the inner end 161 of travel adjustment means 116 to be later described and as shown in FIG. 23.

Piston member 72 is shown in isolation in FIGS. 9, 10 and 11. A bore 118 and counterbore 120 receive the right hand (as viewed in FIG. 2) tubular extension 88 of a car half 86 in a friction fit relationship. The other end of piston 72 is formed with a groove 122 for receipt of an O-ring 124 or other suitable sliding seal which is cooperative with the groove and with the inner wall surfaces of cylinder 74. Also a central bore 126 of piston 72 has an internal stop surface 128 for cooperation with the end 161 of adjustment means 116. As will be appreciated the biasing means 68 loads the entire assembly to the right as viewed in FIGS. 2, 21, 22 and 23, and with no air pressure in the cylinder against the piston 72, the parts assume the position of "at rest-closed" as shown in FIG. 23. The cylinder 74 is best perceived in FIG. 2, the inner end thereof being relieved and fixed to a suitable bore in the end surface 130 of the valve body.

A cylinder end cap 132 for cylinder 74 is shown in assembled relationship in FIGS. 1, 2 and 4 and in isolation in FIGS. 18, 19 and 20. It is generally rectilinear in end view (see FIGS. 4, 18 and 20) with four through bores 134 each of which are counterbored at 136 to receive fasteners 138 (see FIG. 1) which clamp the end cap 132 to the valve body. An annular groove 140 in the inner surface of the end cap 132 has a suitable O-ring 142 which sealingly bears against the end of cylinder 74 which fits thereagainst in sealing engagement.

A tubular extension 144 is formed in the center of the end cap 132 having a central smooth bore 146 and threaded counterbore 148 which coacts with the adjustment means 116. An air pressure fitment threaded bore 150 receives a suitable air pressure source (not shown) which enters the cylinder through a port 152. Typically, a 3 way air pressure valve (not shown) is upstream of fitment bore 150, permitting air pressure entering through port 152 to move the piston 72 in cylinder 74 against the bias of spring 68 and to exhaust out port 150 when the 3 way valve is exhausted to atmosphere. It will be appreciated that many ways of controlling ingress and egress of air pressure through port 152 are available by conventional techniques including manual and automatic.

The adjustment means 116 is shown in sectional assembled relationship in FIG. 2, in end view in FIG. 4 and in isolation in FIGS. 12 and 13. It comprises an elongated shank which is smooth at the left side as viewed in FIG. 13 with spaced annular grooves 155 and 156. Groove 155 receives a snap retaining ring 153 and groove 156 is for receipt of an O-ring 157 which is disposed therein to sealingly cooperate with bore 146 when assembled. The shank is threaded at 158 to cooperate with threaded counter bore 148 of end cap 132. The outboard end of shank 154 is fitted with a knurled knob 160 which is fastened by suitable means such as shown by a fastener 162. The inboard end of shank 154 terminates in a surface 161 which is coactable with piston bore end surface 128. As will be appreciated, surface 161 can be moved inwardly and outwardly by turning knob 160 and the limit of travel of the car under spring 68 is thus determined.

The progressive movement of car means 66 and thus the roller means 36 under the influence of spring 68 is shown by the relative position of parts in FIGS. 2, 21, 22 and 23. The at-rest position is shown in FIG. 23 with end surface 161 engaging surface 128 of bore 126 of the piston. The full "open" position, with air pressure on piston 72 is shown in FIG. 2. The initial constriction site 38 of the conduit means 26 occurs (as shown in FIG. 22) when surface 161 may be spaced a considerable distance from the surface 128. However, that distance may be changed, to change the amount of travel of the conduit constriction and relief, and thereby adjust the suck back. This is easily done by adjusting the position of end surface 161. The greater the overtravel from the constricting site 38, the greater the suck back and vice versa.

The flexible conduit means 26 may be made of suitable resilient tubing such as polyvinyl chloride tubing or the like depending on the nature, working pressures and other characteristics of the work liquids to be encountered. Polyvinyl chloride tubing has been found to be easily available and to withstand a substantial number of compressions at normal working pressures without deterioration and replacement being required.

It will be appreciated that the resilient layers 100 of the roller means 36 and the resiliency of the conduit 26 walls per se make the device well adaptable for work liquids with particulates without destroying the valve parts or without excessive wear.

It will be noted that the car movement (and hence roller means 36) is an uncomplicated linear reciprocating path which permits easy machining and assembly. The same functional result could be obtained by a curved path of movement of the roller means 36 and a straight line location of the conduit means 26, but at greater complication and cost. It will also be appreciated that instead of a piston 72 and cylinder 74 as an actuator means, a solenoid or other prime mover could be substituted (not shown). However, pneumatic pressure to move the car 66 is generally advantageous in that work liquids moving through the conduit means 26 are generally pressurized and thus use of the same energy source for the work liquids as the pressure source against the spring 66 is advantageous. Also explosion risk from a solenoid actuator electric spark which is possible in some environments, is eliminated by a pneumatic actuator.

In operation, air pressure is applied through port 152 to move the piston 72 in the cylinder 74 to compress the biasing spring means 68 which causes the car means 66 and associated roller means 36 to move from the position shown in FIG. 23 to the position shown in FIG. 2 where the bumper pin 104 either bottoms on the end surface of the plug bore 110 or the end of fastener 108. Work liquid will now pass from the inlet means 28 through the conduit means 26 to the outlet means 30, i.e. the dispensing mode of the apparatus. As long as air pressure is maintained on piston 72, work material will flow. It will be noted that the work material has relatively free passage through the conduit means 26 since the I.D. is unrestricted.

In shutoff, the air pressure is removed from port 152 and upstream thereof (not shown) is vented to atmosphere. The biasing means 68 is then no longer opposed and has sufficient force to move the roller means 36 from the position shown in FIG. 2 through the positions of FIGS. 21, 22 and 23 against the friction of the parts and seals, and the pressure of the work liquid in the resilient conduit. The at-rest position is determined by the adjustment means 116 which also determines amount of suck back as discussed.

It will be noted that the moving parts of the air cylinder can be easily removed for seal change and service without disruption of other parts. It will also be observed that conduit means 26 may be easily serviced. Suck back may be adjusted without disassembly and reassembly.

It will also be noted that if air pressure goes off for any reason, the dispensing will shut off.

While the foregoing specification gave a detailed description of a specific embodiment of apparatus and method of the invention, they were set forth for the purpose of illustration and it will be understood that many of the details herein given may be varied considerably by those skilled in the art without departing from the spirit and scope of the invention.

I claim:

1. A compact unitary actuator and pinch valve assembly for positive suck back of work material on shutoff comprising body means having straight travel surface, resilient conduit means mounted on said body means and having an inlet, outlet, intermediate portion, and a normal configuration permitting full flow of work material from said inlet therethrough to said outlet, linearally movable actuator means within said body means movable in a plane parallel with said straight travel surface, linearally movable conduit engaging means operatively associated with said actuator means for movement between first, second and third positions, linearally alligned positions, the direction of movement from said first to second to third positions being substantially counter direction to the flow of work material in said intermediate portion of said resilient conduit means, and parallel with said straight travel surface, said linearally movable conduit engaging means having roller means with first and second roller means portions, said first roller means portion being in rolling engagement with said straight travel surface, said second roller means portion being engageable with said intermediate portion of said resilient conduit means, said conduit engaging means in said first position being operatively arranged to have said second roller means portion spaced to operatively permit said resilient conduit means to maintain its normal configuration and full flow of material therethrough, said conduit engaging means while in and while moving between its second and third positions being operatively arranged to have said second roller means portion engage and compress said intermediate portion of said resilient conduit means to maintain stoppage of flow of work material therethrough, said conduit engaging means second roller means portion being further operable when moving from said second to third positions to permit a portion of the area previously compressed when said conduit engaging means was in its second position to move under inherent resiliency toward normal configuration and thereby cause a partial internal vacuum in said resilient conduit means to in turn cause suck back of material downstream thereof at said outlet.

2. The unitary actuator and pinch valve assembly set forth in claim 1 wherein said body means is formed with a ramp portion, said resilient conduit intermediate portion is disposed in overlaying engagement with said ramp portion for compression thereagainst by said conduit engaging means second roller means portion, and said ramp portion is located and arranged parallel with said straight travel surface of said body means.

3. The assembly set forth in claim 2 wherein said linearally movable actuator means comprises actuation means and biasing means, said actuation means has an at rest position and an actuated position, said actuation means when in its at rest position defining the third position of said roller means and when in its actuated position moving said roller means to its said first position, said biasing means being operable to bias said roller means from its first toward its third positions, roller travel adjustment means, said roller travel adjustment means being operatively engageable with said actuation means, said roller travel adjustment means being operable to selectively adjustably define the at rest position of said actuation means and thereby adjustable limit the amount of linear travel of said roller means by said biasing means in movement between its said second and third positions to thereby adjustably vary the suck back of work material at said outlet when said biasing means moves said roller means from said first to second to third positions.

4. The assembly set forth in claim 3 wherein said body means has second adjustment means, said second adjustment means being operable to engage said roller means and define the said first position thereof relative to said ramp portion and the resilient conduit means intermediate portion in overlaying engagement with said ramp portion.

5. The assembly set forth in claim 3 wherein said actuation means comprises a linearally movable piston member mounted within said body means and drivingly engageable with said roller means, control movement means for moving said piston member, said control movement means being operable to selectively move said piston member and thereby said roller means from said third position to said first position to permit flow of work material through said pinch valve against the bias of said biasing means, the position of said piston when said actuation means is in its at rest position being defined and limited by said roller adjustment means.

* * * * *

UNITED STATES PATENT AND TRADEMARK OFFICE
CERTIFICATE OF CORRECTION

PATENT NO. : 4,403,764
DATED : September 13, 1983
INVENTOR(S) : Thomas J. Repplinger It is certified that error appears in the above-identified patent and that said Letters Patent is hereby corrected as shown below:

Col. 10, line 19, change "adjustable" to --adjustably--.

Signed and Sealed this

Fifteenth Day of November 1983

[SEAL]

Attest:

GERALD J. MOSSINGHOFF

Attesting Officer     Commissioner of Patents and Trademarks